(No Model.)
A. T. & W. J. BONEY.
CULTIVATOR ATTACHMENT.
No. 554,647. Patented Feb. 18, 1896.
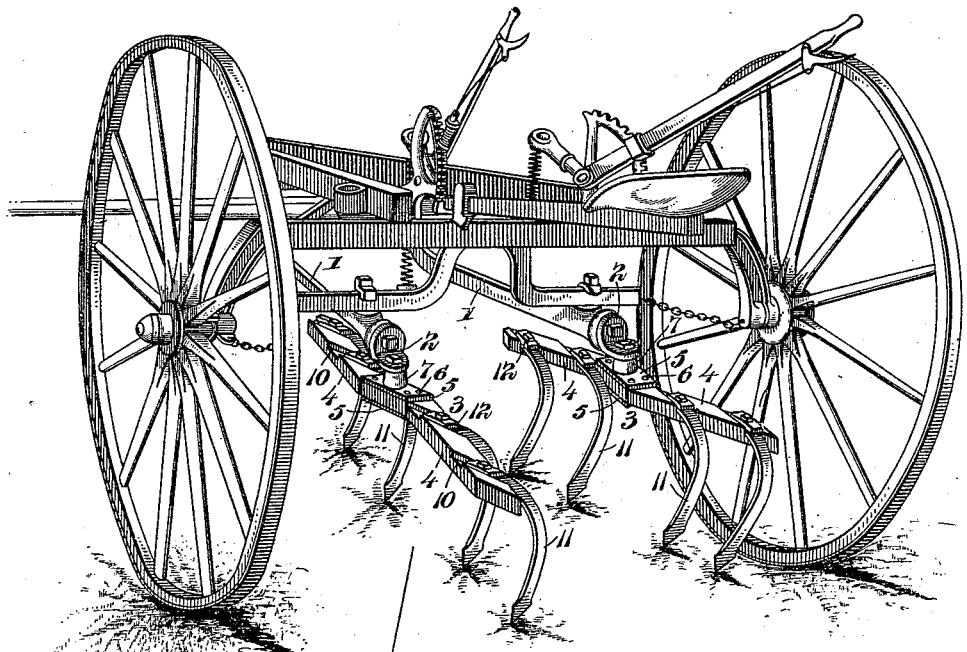
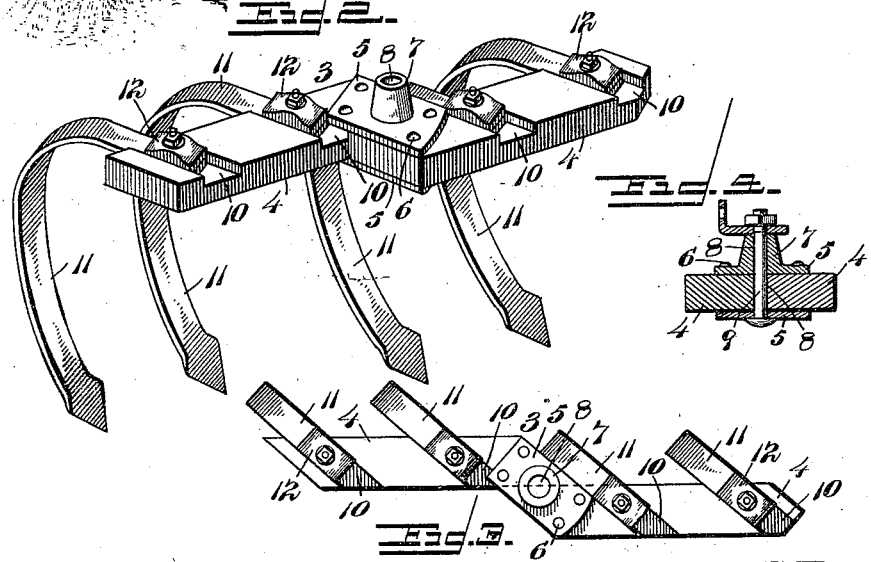
Witnesses
E. A. Stewart
R. M. Smith
By their Attorneys,
Inventors
Arthur T. Boney and
William J. Boney
C. A. Snow & Co.
ANDREW B.GRAHAM, PHOTO-LITHO, WASHINGTON, D.C.

UNITED STATES PATENT OFFICE.

ARTHUR T. BONEY AND WILLIAM J. BONEY, OF CAIRO, MISSOURI.

CULTIVATOR ATTACHMENT.

SPECIFICATION forming part of Letters Patent No. 554,647, dated February 18, 1896.

Application filed September 28, 1895. Serial No. 564,036. (No model.)

*To all whom it may concern:*

Be it known that we, ARTHUR T. BONEY and WILLIAM J. BONEY, citizens of the United States, residing at Cairo, in the county of Randolph and State of Missouri, have invented a new and useful Cultivator Attachment, of which the following is a specification.

This invention relates to an improvement in disk cultivators, and refers more particularly to the construction of the drag-bars which carry the cultivator teeth or disks.

The object of the present invention is to provide a simple and efficient drag-bar for cultivators, the same being constructed in a peculiar manner, adapting it to have secured thereto cultivator-teeth of equal length and configuration, while at the same time disposing said teeth in oblique relation to the line of travel, and wherein provision is made for preventing said teeth from turning or swinging laterally with relation to the drag-bar, the device as a whole constituting an attachment which may be readily applied to a cultivator of any description in lieu of the ordinary cultivator-disks and the bar to which they are attached.

To the above end the invention consists in certain novel features and details of construction and arrangement of parts, as hereinafter fully described, illustrated in the drawings, and finally embodied in the claims.

In the accompanying drawings, Figure 1 is a perspective view of a disk cultivator, showing the application of the present invention thereto. Fig. 2 is an enlarged detail perspective view of the improved attachment. Fig. 3 is a plan view of the same. Fig. 4 is a detail section through the drag-bar in line with the king-bolt.

Similar numerals of reference designate corresponding parts in the several figures of the drawings.

Referring to the accompanying drawings, the cultivator therein illustrated is similar in its general construction to cultivators now in common use, the same being provided with a pair of substantially horizontal beams 1, having at their rear ends brackets or hangers 2, to which the drag-bars and the disks carried thereby are secured. The improved attachment, which will now be described, is especially applicable to the cultivator illustrated in the accompanying drawings; but the invention contemplates constructing said attachment in such manner that it will be equally applicable to any well-known form of disk cultivator.

The drag-bar 3 of the improved attachment comprises two substantially similar tooth-holding sections 4, which are constructed preferably of wood and arranged in different longitudinal planes. The inner adjacent ends of said sections 4 are beveled off at an angle of about forty-five degrees, more or less, and arranged to overlap, while at the same time the edges of said sections are caused to abut against each other and to occupy the relation shown in Fig. 2 and in dotted lines in Fig. 3. Above and beneath the overlapping ends of the sections 4 are placed metal plates or castings 5, which are substantially rectangular in form and provided at their corners with vertically-aligning perforations, through which pass suitable bolts 6 for firmly uniting said sections together.

In order to adapt the drag-bar particularly to the cultivator shown in the drawings, the upper plate 5 is formed in the process of manufacture with an upwardly-extending conico-cylindrical boss 7, and this boss, as well as the lower plate 5, is vertically bored, as shown at 8, to receive a king-bolt 9, by means of which the drag-bar is secured to the bracket 2, above referred to. By changing the form of the boss on the upper plate 5, the device may be adapted for use in connection with other kinds of cultivators. The drag-bar sections are formed in their upper faces with two or more obliquely-disposed grooves 10, and said grooves are for the purpose of receiving the upper and forward extremities of a corresponding number of spring cultivator-teeth 11. The upper extremities of these teeth fit snugly within the oblique grooves 10 referred to, and are firmly secured therein each by means of a vertical bolt which passes through perforations in the drag-bar and end of the tooth, and also through a perforated metal block or washer arranged above and upon the upper end of the tooth. The oblique grooves in the drag-bar sections are purposely made of slightly greater depth than the thickness of the teeth 11, and the blocks or washers referred to and designated by the numeral 12 correspond approximately in width and rest partially within said grooves and are thereby prevented from turning and working loose. The teeth 11 are made from spring metal and have their lower extremities pointed or expanded in any preferred manner, and by reason of the particular shape of the drag-bar said teeth may be made all of a uniform length and size, whereas in devices of this nature as heretofore constructed the teeth 11 have of necessity been required to be made of varying lengths in order to dispose the same obliquely and enable the teeth to properly clear themselves in the ground in the forward movement of the machine.

The present construction of drag-bar enables the manufacturer to construct the teeth exactly similar and to so place them upon the market.

The construction above described affords a very simple, inexpensive, and efficient attachment for cultivators which may be readily applied to any cultivator in common use and is intended to replace the usual disk gangs when needed in the cultivation of small corn, &c.

Changes in the form, proportion, and minor details of construction may be resorted to without departing from the spirit or sacrificing any of the advantages of this invention.

Having thus described the invention, what is claimed as new, and desired to be secured by Letters Patent, is—

1. The herein-described attachment for disk cultivators, comprising a drag-bar having two sections disposed in different longitudinal but parallel planes the said sections being overlapped at their adjacent ends with their contiguous longitudinal edges abutting, tie plates or castings rigidly connecting the overlapping ends of said sections, and a series of cultivator-teeth secured to said drag-bar sections and disposed in oblique relation thereto, substantially as described.

2. The herein-described attachment for cultivators, the same consisting of a drag-bar comprising substantially similar sections extending in different longitudinal planes and having their adjacent ends overlapped and beveled, a pair of obliquely-disposed tie-plates located on opposite sides of said overlapping ends and covering the joint or meeting edges thereof and formed with vertically-aligning perforations for the reception of the king-bolt, a series of obliquely-extending grooves in said drag-bar sections, and a corresponding series of cultivator-teeth secured within said grooves, substantially as set forth.

In testimony that we claim the foregoing as our own we have hereto affixed our signatures in the presence of two witnesses.

ARTHUR T. BONEY.
WILLIAM J. BONEY.

Witnesses:
G. W. SHAW,
M. O. COPP.